3,046,277
PIPERAZINE SULFITE

James R. Anslow, Austin, Tex., assignor to Jefferson Chemical Company, Inc., Houston, Tex., a corporation of Delaware
No Drawing. Filed Sept. 12, 1960, Ser. No. 55,154
7 Claims. (Cl. 260—268)

This invention relates to a piperazine polysalt and to a method of preparing the same. More particularly, this invention relates to piperazine polysulfite compositions and to the preparation of the same.

Piperazine and salts thereof are useful for a variety of purposes (e.g. as corrosion inhibitors, as anthelmintic agents for the de-worming of animals and poultry, etc.). The provision of a piperazine salt that can be stored and handled with ease presents many problems.

It has now been discovered, surprisingly, that a salt having improved physical properties can be provided through the provision of a salt of piperazine comprising sulfite ions combined with piperazine.

The starting materials for the present invention are piperazine or an alkyl piperazine, water, and sulfur dioxide.

The starting materials for the present invention include sulfur dioxide and piperazine or a $C_1$ to $C_4$ alkyl piperazine such as 2,6-dimethyl piperazine, 2,6-diethyl piperazine, 2,3,5,6-tetramethyl piperazine, 2,3,5,6-tetraethyl piperazine 2-methyl piperazine, 2-butyl piperazine, etc. or a mixture thereof. Thus, the piperazine-type starting material may be represented by the formula:

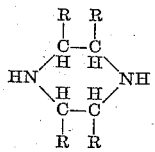

wherein: R is selected from the group consisting of hydrogen and $C_1$ to $C_4$ alkyl groups.

Thus, polysulfites such as tripiperazine disulfite may be formed as well as the corresponding C-alkyl piperazine polysulfites. Although piperazine and alkyl piperazines are basic compounds having a pH above 9, the polysulfites are significantly less basic and may even have an acid pH of less than 7 in aqueous solution. A preferred class of piperazine polysulfites are piperazine polysulfites which will provide aqueous solutions having a pH of 6.5 to 9 at 20° C. in 20 wt. percent aqueous solution.

A preferred method of preparation is to provide a concentrated aqueous solution of piperazine to which sulfur dioxide is added with or without but, preferably, with agitation. When this is done, sulfite formation occurs with precipitation. The precipitate will comprise the piperazine polysulfite of the present invention. Sulfur dioxide addition is continued until a 20% aqueous solution of the precipitate at 20° C. has a desired pH within the range of about 6.5 to 9. That is to say, the degree of interpolymerization (which will cause a decrease in pH as the degree of interpolymerization increases) is regulated by the pH determination. When a sample of the precipitate provides an aqueous solution having the desired pH, the addition of sulfur dioxide is terminated and the precipitate is recovered in any desired manner (e.g. by filtration or centrifugation) to provide a purified piperazine polysulfite product. Surprisingly, the impurities tend to remain in solution.

In somewhat greater detail, the piperazine polysulfite of the present invention may be prepared by adding sulfur dioxide to a concentrated aqueous solution of piperazine (containing, for example, from about 40 to 60 wt. percent of piperazine). The addition is preferably accomplished by bubbling gaseous sulfur dioxide into the piperazine solution at a temperature within the range of about 20° to 100° C. Preferably from about 0.6 to about 0.9 mol of sulfur dioxide is provided for each mol of piperazine. Although lesser amounts may be employed, this is not entirely advantageous because of an increase in the pH of the product that is associated with the use of the lesser amounts of sulfite radical donor. With greater amounts of sulfur dioxide the pH of the product will be lowered.

On addition of the sulfur dioxide the piperazine sulfite composition of the present invention will form and precipitate. It is conveniently recovered by filtration of the resultant slurry under ambient conditions.

The filtrate will normally contain the bulk of the impurities and will also contain a dissolved dipiperazine monosulfite.

The precipitate that is recovered by filtration is a white, water soluble, crystalline material consisting essentially of a piperazine polysulfite composition containing at least three mols of piperazine combined with at least two mols of sulfite radical.

The invention will be further illustrated by the following specific example which is given by way of illustration and not as a limitation on the scope of this invention:

Example 1

A 55% by weight piperazine solution was made by mixing 550 grams of flaked piperazine with 450 ml. of city water. The solution was heated to 50° C. to get all of the piperazine in solution. The solution was then transferred to a three-necked, 3,000 ml. reaction flask. A bottle of anhydrous sulfur dioxide was placed on a scale and a hose connected from it to a glass outlet submerged under the liquid level in the flask. An agitator was then installed for agitating the reaction mixture.

Agitation was started and 206 grams of $SO_2$ was allowed to bubble into the reaction mixture over a period of about 30 minutes. Precipitation occurred. The pH of 1 part product slurry:5 parts distilled water was then taken and found to be 7.8. An additional 20 grams of $SO_2$ was added to the reaction mixture. This corresponds to a total addition of about 0.7 mol of $SO_2$ per mol of piperazine. The pH of 1 part product:5 parts distilled water was again taken and found to be 7.45. The reaction temperature at the start was 26° C. and the maximum temperature attained while adding $SO_2$ was 62° C.

Approximately 30% of the charge (375 grams) was recovered as a yellow filtrate containing piperazine monosulfite and having an analysis of 37.1% piperazine and 49.03% water by weight. The remaining white granular precipitate (about 800 grams) consisting essentially of tripiperazine disulfite was dried in an oven for three days and then analyzed. Analysis showed 49.23% piperazine and 25.3% water by weight; a pH of 1 part product:5 parts water of 7.2; and, a water solubility of 64.9 grams of product/100 ml. of solution (equivalent to a 19.4% piperazine by weight solution).

Equivalent results are obtained when 2,6-dimethyl piperazine or 2,3,5,6-tetramethyl piperazine is substituted for the piperazine and Example 1 is otherwise repeated except, of course, that the polysulfite product will be a C-alkyl piperazine polysulfite correspoinding to the alkyl piperazine starting material.

As adduced by the foregoing examples, the product of the present invention may be characterized as a piperazine polysulfite prepared by sulfiting piperazine in aqueous solution with an amount of sulfur dioxide sufficient to provide a sulfite containing at least 3 mols of piperazine combined with at least 2 mols of sulfur dioxide.

A preferred embodiment of the present invention comprises an aqueous solution of a piperazine polysulfite having a pH of from about 6.5 to 9 containing from more than about 2.5 to about 10 mols of water per mol of piperazine in the piperazine polysulfite. Aqueous solutions of this nature have surprising and unusual properties including a high piperazine content and low temperature freeze-thaw stability.

Having described my invention, what is claimed is:

1. Tripiperazine disulfite.

2. A method for the preparation of a piperazine sulfite composition which comprises at least partially neutralizing a piperazine compound with sulfur dioxide in aqueous solution to thereby provide, as an addition product, a sulfite of said piperazine compound, said piperazine compound having the formula:

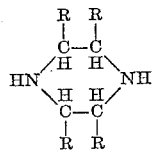

wherein: R is selected from the group consisting of hydrogen and $C_1$ to $C_4$ alkyl groups.

3. A method as in claim 2 wherein the piperazine compound is piperazine.

4. A method as in claim 2 wherein the piperazine compound is 2,6-dimethyl piperazine.

5. A method as in claim 2 wherein the piperazine compound is 2,3,5,6-tetramethyl piperazine.

6. A method which comprises the steps of contacting piperazine in aqueous solution at a temperature within the range of about 20° to 100° C. with from about 0.6 to about 0.9 mol of sulfur dioxide per mol of piperazine to thereby provide a piperazine polysulfite precipitate and recovering said piperazine polysulfite precipitate, a 20% aqueous solution of said piperazine polysulfite at 20° C. having a pH within the range of about 6.5 to 9.

7. A method as in claim 6 wherein about 0.7 mol of sulfur dioxide per mol of piperazine is employed and wherein the precipitate comprises tripiperazine disulfite.

References Cited in the file of this patent

UNITED STATES PATENTS

| | | |
|---|---|---|
| 2,753,350 | Hasselstrom | July 3, 1956 |
| 2,919,275 | Bond | Dec. 29, 1959 |